May 23, 1961 W. ERNST 2,985,109
HYDRAULIC PUMP
Filed Feb. 2, 1955 3 Sheets-Sheet 1

INVENTOR.
WALTER ERNST
BY
Toulmin & Toulmin
ATTORNEYS

May 23, 1961 W. ERNST 2,985,109
HYDRAULIC PUMP
Filed Feb. 2, 1955 3 Sheets-Sheet 2
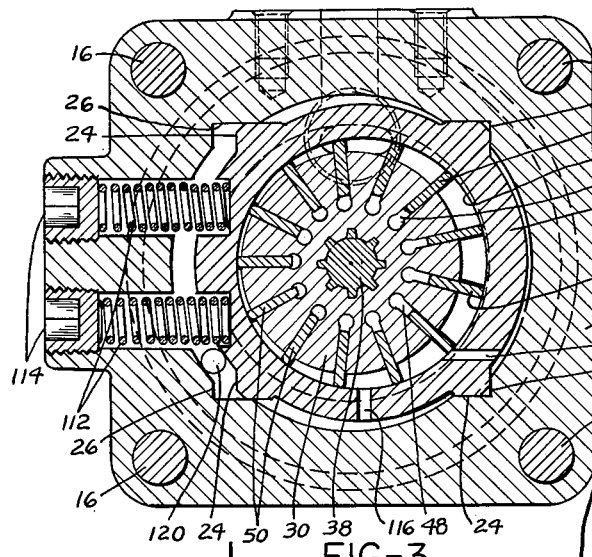
FIG-3
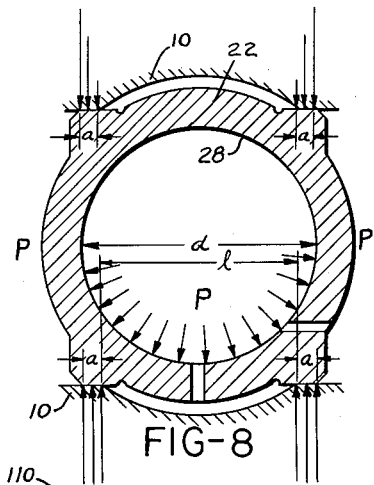
FIG-8
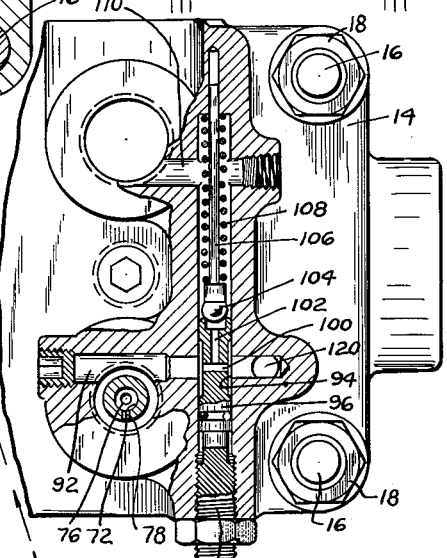
FIG-4
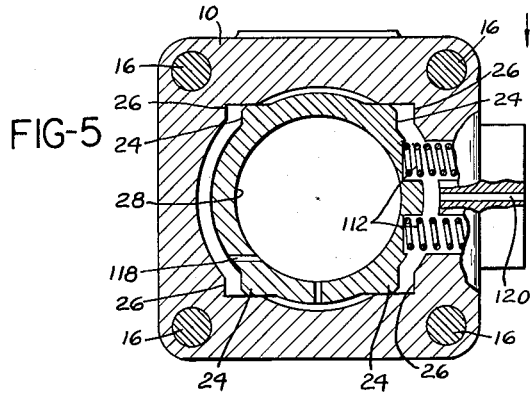
FIG-5
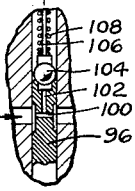
INVENTOR.
WALTER ERNST
BY
Toulmin & Toulmin
ATTORNEYS May 23, 1961 W. ERNST 2,985,109
HYDRAULIC PUMP
Filed Feb. 2, 1955 3 Sheets-Sheet 3
FIG-6
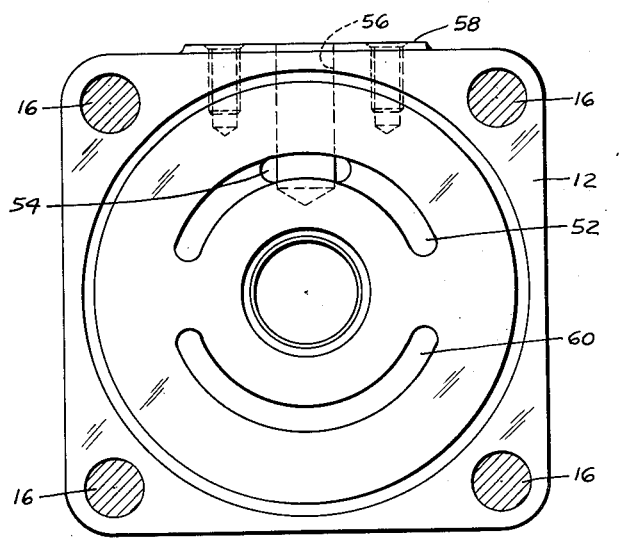
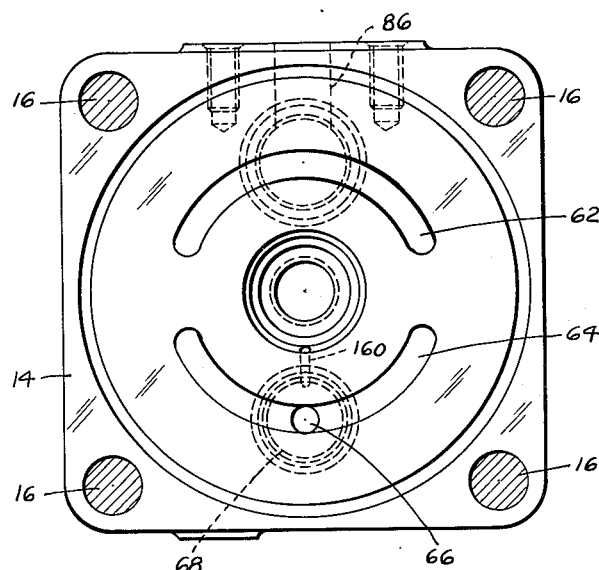
FIG-7
INVENTOR.
WALTER ERNST
BY
Toulmin & Toulmin
ATTORNEYS

United States Patent Office 2,985,109
Patented May 23, 1961

2,985,109
HYDRAULIC PUMP

Walter Ernst, Dayton, Ohio, assignor to The Thompson Grinder Company, Springfield, Ohio, a corporation of Ohio Filed Feb. 2, 1955, Ser. No. 485,715

3 Claims. (Cl. 103—120)

This invention relates to hydraulic pumps and to a method of operation thereof, and is particularly concerned with a vane-type hydraulic pump.

The use of hydraulic pumps in industry and in automotive devices has increased materially in recent times, and a great many of these pumps are of the vane type. This type of pump is relatively inexpensive and has a large capacity, but is relatively small in size. This characteristic fits the vane-type pump for such purposes as a supplier of motive power for power steering arrangements and the like. It is such a pump structure with which the present invention is particularly concerned.

A primary object of the present invention is to provide a pump structure especially adapted for use with power steering devices in automobiles and the like which is relatively inexpensive and which is also relatively small and compact.

A further object of this invention is the provision of a hydraulic pump especially adapted for use with power steering arrangements which is variable in volume, but which normally discharges pressure fluid at a constant rate.

Another object of the present invention is the provision of a hydraulic pump especially adapted for use with power steering arrangements which always requires the minimum of power to maintain it in operation.

It is also an object of the present invention to provide a vane-type hydraulic pump which is variable in volume, and with which is integrally associated the volume-controlling auxiliaries.

A still further object of the present invention is the provision of a hydraulic pump which has long life and in which the bearing loads are maintained at the minimum at all times.

These and other objects and advantages of this invention will become more apparent upon reference to the following specification, taken in connection with the accompanying drawings, in which:

Figure 3 is a transverse sectional view indicated by line 3—3 on Figure 2;

Figure 4 is an end view looking in in the direction of the arrow 4 in Figure 2, but with a portion of the pump casing broken away to show an arrangement of valve means and restrictor port means therein;

Figure 5 is a diagrammatic view showing the hydraulic circuit pertaining to the pump and the manner in which the movable flow-controlling member of the pump is shiftable to control the volume of the pump;

Figure 6 is a sectional view indicated by line 6—6 on Figure 2 showing the valving in one of the end members of the pump housing;

Figure 7 is a sectional view indicated by line 7—7 on Figure 2 showing the valving pertaining to the end member of the pump casing opposite the one illustrated in Figure 6; and Figure 8 is a diagrammatic view illustrating the pressure conditions which prevail when the pump is in operation.

Figure 1:
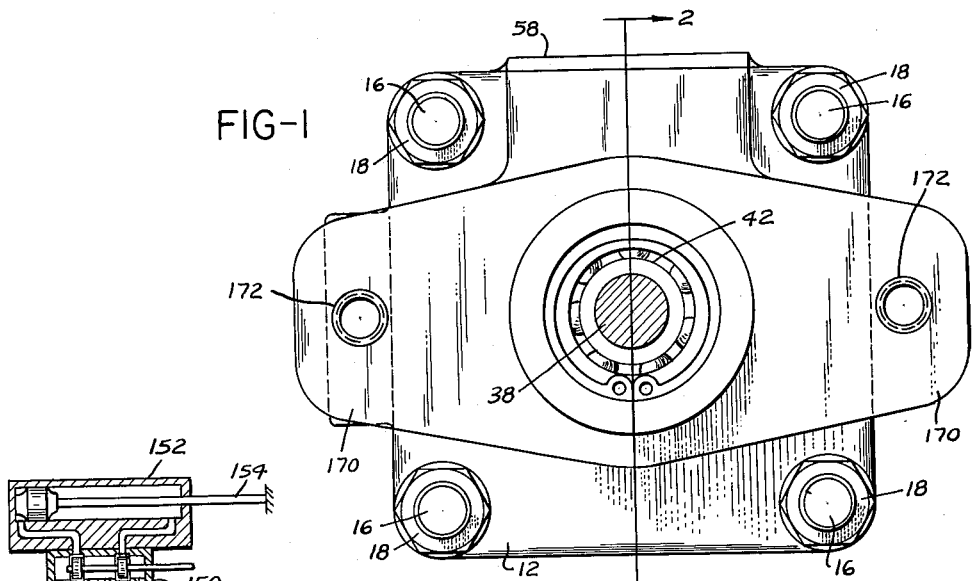
Figure 1 is an end elevational view of a pump constructed according to my invention.
Figure 2:
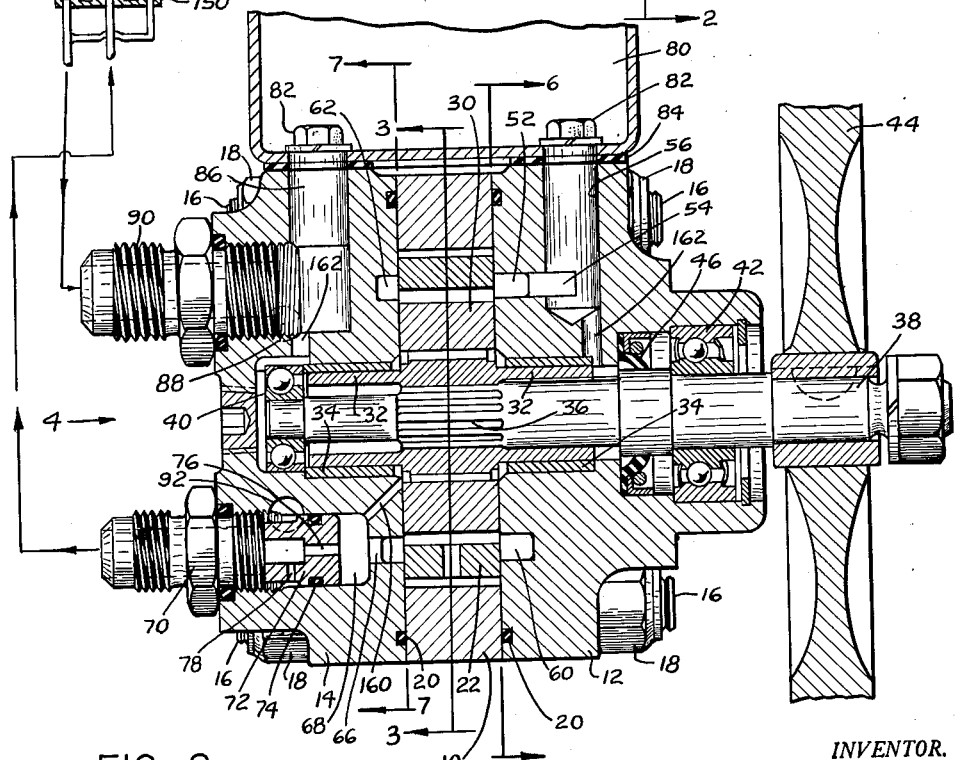
Figure 2 is a vertical longitudinal section taken through the pump as indicated by line 2—2 on Figure 1.

Referring to the drawings somewhat more in detail and in particular to Figures 1 through 3, a pump constructed according to the present invention comprises a central housing member 10 having fitted thereto a front cover 12 and a rear cover 14.

These three principal components of the pump housing are secured together by the bolts 16 extending through the central housing part and the end covers adjacent the corners thereof and having the nuts 18 threaded thereto.

A feature of the present invention consists of utilizing the bolts 16 to retain the central part of the pump housing and the end covers in rigidly aligned relation by finish grinding the bolts so that they fit extremely closely in the bores provided therefor, whereby the bolts serve as dowels to align the housing parts in fixed relation with each other and to retain the said parts in this relation.

An effective seal is established between central housing part 10 and covers 12 and 14 by use of the annular O rings 20 disposed between the central housing part and the covers and located in grooves in one or both thereof.

Located within central housing part 10 and slidably fitting between covers 12 and 14 is a shiftable ring 22. This ring, as will be seen in Figure 3, has angle projections 24 thereon that are receivable in angle recesses 26 in housing part 10. The combination of the projections and recesses supports ring 22 against rotation, while permitting lateral shifting thereof within housing part 10 to vary the eccentricity between the central bore 28 of the ring and the rotor 30 which is located on the axis of housing part 10.

Rotor 30, as will best be seen in Figure 2, has cylindrical end parts projecting therefrom into covers 12 and 14, as indicated at 32, which are received in the sleeve bearings 34 fitted into bores in the said covers. This supports the rotor for rotation with a direct bearing on the covers closely adjacent the central portion of the rotor which is subjected to load.

The rotor is axially bored and in the region of the center thereof is provided with splines engaging the splines 36 on a driving shaft 38 which has its one end supported in an antifriction bearing 40 in rear cover 14, and its other end passing through an antifriction bearing 42 in front cover 12.

The end of shaft 38 projecting beyond bearing 42 is adapted for connection to any suitable driving means, such as the pulley 44 illustrated in Figure 2. An oil seal 46 is preferably located inwardly of bearing 42 so as to seal between cover 12 and shaft 38.

Rotor 30 is provided with radial slots 48 which are disposed with vanes 50 that bear against the periphery of bore 28 in ring 22 so that pumping chambers are defined between the ring, the rotor, and the vanes. These pumping chambers communicate at their ends with passages in covers 12 and 14, and which passages are best seen in Figures 6 and 7.

Figure 6 shows the cover 12 to be provided with the inwardly opening arcuate groove 52 communicating, via port 54, with bore 56 that opens out through the machined flat surface at 58 on the upper end of the said front cover. A second arcuate slot 60 is also provided in front cover 12 which is not connected through the said cover with any external ports.

In Figure 7 it will be observed that rear cover 14 is provided with an inwardly opening arcuate slot 62 which is located so as to register with slot 52 in front cover 12, which slot 62, similarly to slot 60, has no connections with any external ports.

Rear cover 14 is also provided with the arcuate inwardly opening slot 64 which registers with slot 60 in front cover 12, and which slot 64 communicates via port 66 with a threaded bore 68 opening out the back face of rear cover 14.

Threaded bore 68 is the passage through which pressure fluid is discharged from the pump, and is provided at its outer end with a threaded fitting 70, to which a conduit leading to the mechanism to be operated can be attached.

For a purpose that will become more apparent hereinafter fitting 70 has integral therewith a plug portion 72 fitting in bore 68 and sealed thereto as by O ring 74. Plug portion 72 comprises a restricted bore 76 in the end thereof through which the entire discharge of the pump passes, and a laterally opening restricted port 78 through which, as will be seen hereinafter, a part of the pump discharge is bypassed back to the suction side of the pump under certain conditions of operation.

On the suction side of the pump the bore 56 previously referred to, and which is located in front cover 12, opens upwardly into an oil tank 80 bolted to the top surface of the pump as by the bolts 82 and sealed thereto by gasket means 84. Tank 80 also has an opening communicating with a bore 86 in rear cover 14, and bore 86 is intersected by a threaded bore 88 in cover 14 in which is mounted a fitting 90, to which the exhaust side of the hydraulic circuit being supplied by the pump is connected.

The described arrangement on the suction side of the pump provides for all of the oil being returned to the pump to be passed directly to the oil tank, and for the pump always to draw fluid from the tank whereby the maximum opportunity is available for cooling of the oil.

It will be evident that where the cooling of the oil is not an important consideration, threaded bore 88 could open directly into arcuate groove 62, if so desired.

Returning to the pressure side of the pump, the annular space around plug portion 72 of fitting 70, which communicates with the bore through the plug via restricted port 78, also communicates with a drilled passage 92 in rear cover 14 which extends laterally thereof and intersects a rather elongate bore 94 within which is mounted a relief valve structure consisting of a piston portion 96 sealingly mounted in the bore and adjustable therein by virtue of the screw-threaded means at 98.

Piston 96 has a lateral bore 100 opening into drilled hole 92 and an axial bore 102 communicating with lateral bore 100. At its upper end passage 102 is adapted for being normally closed by ball 104 engaged by a plunger 106 that is spring urged downwardly by the spring 108.

It will be apparent that ball 104 will lift at a predetermined pressure therebeneath to release fluid from passage 102, and that the exact pressure at which the ball 104 will lift can be varied by axial adjustment of stem 96 in the bore 94.

The upper end of bore 94 communicates via radial passage 110 with bore 86 or bore 88 leading to tank 80.

The ring 22, previously referred to and which operates as a flow-controlling element for the pump, is normally urged toward a position of maximum eccentricity relative to rotor 30 by a pair of compression springs 112 bearing between the said ring and plugs 114 inserted in the ends of spring-receiving bores in one side of central housing part 10.

Inasmuch as the lower half of the rotor and ring is under pressure when the pump is running there will be a downward thrust on the ring which, according to the present invention, is counterbalanced by connecting the space beneath the ring with the inside thereof via drilled passage 116.

By providing for the effective area over the bottom face of the ring to be substantially equal to the effective area inside the ring that is under pressure acting downwardly, the total thrust on the ring due to pressures within the pump is substantially balanced out, thereby relieving the pressure with which the ring bears on the central housing part 10, thus permitting easy shifting of the ring to vary the discharge rate of the pump.

The righthand face of the ring 22, as it is viewed in Figure 3, is also connected with the pressure side of the pumping space between the rotor and the ring by the passage 118, and it will be evident that the pressure generated within the pump will act on the righthand face of ring 22 in opposition to the springs 112.

A still further hydraulic connection is made to the space between ring 22 and housing part 10 on the lefthand side of the ring, and this connection consists of the passage 120, one end of which is seen in Figure 3 and the other end of which is seen in Figure 4, wherein it will be observed that passage 120 is subjected to the discharge pressure of the pump while the relief valve in bore 94 is closed.

When the relief valve in bore 94 opens, as will be seen hereinafter, the restricted port 78 produces a pressure drop between the pressure standing in plug 70 and the pressure standing in passage 92 so that there is a pressure drop on the lefthand face of ring 22.

In connection with the feature of balancing the thrust on the ring 22 by means of pressure conveyed to the chamber beneath the ring by the passage 116, Figure 8 will illustrate the conditions which obtain and will also illustrate the manner in which the various dimensions of the ring are proportioned to arrive at substantially a complete balancing out of the internal pressures acting on the ring.

In Figure 8 "P" indicates the pressure developed by the pump. This pressure is conveyed to the chamber directly beneath the ring, to the chamber at the righthand side thereof, and a somewhat smaller pressure is conveyed to the chamber at the lefthand side of the ring.

The areas of the projections about the ring that bear against the pump housing are indicated at "$a$," and it will be observed that those at the bottom of the ring have the same pressure standing across their entire width, whereas those at the top of the ring have a pressure standing thereon which is zero at the inner edges of the areas and is substantially pump pressure at the outer edges thereof.

In order to arrive at substantially complete balancing out of the pressure thrusts on ring 22 the following equation may be written $$Pd \text{ plus } Pa \text{ equals } Pl \text{ plus } 2Pa$$

where $d$ is the internal diameter of ring 22 and $l$ is the lateral dimension of the chamber at the bottom of the ring.

Solving this equation will indicate that to obtain substantially complete balance will require $l$ to be equal to $d$ minus $a$. This is the preferred manner of getting the exact dimensions of the ring, but it will be understood that slight departures therefrom will, many times, be acceptable since such departures will not introduce any extremely high pressure thrusts on the ring.

The righthand outside face of the ring, as it is viewed in Figure 3, since it is not utilized for balancing off any pressure within the ring, is not dimensioned with regard to the diameter of the bore in the ring, but is selected to be of such a size that the thrust of springs 112 will be balanced out when the pump is discharging at its rated capacity.

Operation

With respect to the operation of the pump, it is believed that this will be made clear upon reference to Figures 2 and 5.

Assuming that the pump is connected with the pressure discharge fitting hydraulically-connected with the inlet of a servo-valve 150 and with the suction fitting 90 connected with the exhaust side of servo-valve 150, and that the pump is being driven at about minimum speed by being belt-connected with an idling automotive engine, the discharge from the pump will bypass through valve 150 and back to the suction side of the pump.

The servo-valve 150 is connected for movement with a cylinder 152 of a motor including a ram 154 so that movement of the valve member of the servo-valve will be accompanied by movement in the same direction of cylinder 152 and the body of the servo-valve according to well known practices.

If the valve member of the servo-valve is now operated to move in one direction or the other, the bypass passage through the valve, through which the pumped oil was circulated, is closed and pressure is built up by the pump.

This pressure, as will be observed in Figure 5, is conveyed through hole 118 to act in opposition to springs 112, while a somewhat reduced pressure is conveyed from the downstream side of restricted port 76 to the opposite end of the ring to assist the springs in holding the ring in its fixed position.

This pressure has no effect on the displacement of the pump until the setting of the relief valve is reached. Should this occur, as, for example, in attempting to turn the wheels of the vehicle into a curb or hitting the limit stop of the steering mechanism, the relief valve will open and there will be an immediate pressure drop within the spring chamber in which springs 112 are located due to the movement of the hydraulic fluid through restricted port 78; whereupon the pressure standing in the chamber opposite the spring chamber, which pressure is the full pressure of the pump, will overcome the springs 112 and shift the ring toward a neutral position.

As soon as the condition which caused the relief valve in bore 94 to open has been relieved the relief valve will close and the pump will go on full stroke for a full operation.

Assuming now that the engine is speeded up, the discharge rate of the pump will, of course, tend to increase and this will cause a pressure drop to occur across restricted port 76 in excess of that which occurred when the engine was idling. This greater differential between pressures standing on the opposite side faces of the ring will bring about shifting of the ring against the springs 112 until the condition of equilibrium is again reached.

This equilibrium condition will, of course, be understood to be reached whenever the pressure drop across restricted port 76 balances the thrust of the springs 112 regardless of the actual pressures existing within the system.

It will thus be evident that whatever the speed of operation of the pump may be, or whatever pressure is developed, as long as that pressure is below the setting of the relief valve in bore 94 the pump discharges hydraulic fluid at a constant rate, and if this rate is calculated so as to be the maximum that is required when the mechanism operated by the pump is under full load the power consumption by the pump will be the smallest possible amount.

The pump, according to this invention, embodies certain novel features in addition to those referred to above, such as the manner in which the sleeve bearings 34 remain lubricated at all times. The manner in which this is accomplished will be seen in Figure 2 wherein there is illustrated a drilled hole 160 connecting the pressure side of the pump with an annular space extending about the hub of the rotor, and which space communicates with the bottoms of the vane slots. This space is also located at the inner ends of the sleeve bearings 34. The outer ends of sleeve bearings 34 are connected via passages 162 with the suction side of the pump, and this brings about a continuous circulation of hydraulic fluid along the sleeve bearings 34 whereby they are maintained cooled and lubricated at all times and under all conditions.

The supply of pressure, as described, also serves to urge the vanes of the pump outwardly against the inner surface of ring 22, but it will be understood that it is not essential for the vanes to be urged outwardly under pressure during their entire travel about the ring, but it will suffice that the vanes are urged outwardly during the interval that they are in the pressure zone of the pump.

The pump, as has been described above, embodies a number of features that tend to reduce the cost thereof without in any way detracting from its efficiency of operation or length of service life. Among these features is the absence of any wear plates on the opposite sides of the rotor, which not only eliminates the cost of the wear plates themselves, but also eliminates the cost of machining and porting the wear plates and fitting them to the end covers.

The parts of the pump, consisting of the end covers and the central body portion of the housing, do not require tenons, recesses or separate dowel pins to maintain them in alignment when assembled. Rather, the principal clamping bolts are ground to close tolerances so as to fit tightly in the bores provided therefor, and thus serve as dowels of substantial size for retaining the parts in exact alignment.

Separate slippage connections have been eliminated on the pump and, moreover, slippage within the pump will be at a minimum because the three chambers about the ring, that is, at the sides and bottom, will all be under substantially the same pressure, thus reducing leakage about the ring. The only substantial leakage experienced will be between the discharge and suction sides of the pump. The passages 162, previously referred to, will serve to return all such leakage to the suction side of the pump and also to prevent escape of the fluid from the pump body, while simultaneously, as mentioned before, providing a flow path for lubricating oil through the sleeve bearings 34.

It will also be noted that the antifriction bearing 42 has been positioned as closely to the portion of shaft 38, on which pulley 44 is mounted, as is possible whereby there is a substantial reduction in the bending moment imposed on the shaft 38. This feature, together with the support flange means 170 adjacent the bearing having the mounting holes 172, makes for a compact and extremely strong pump structure.

It will be understood that this invention is susceptible to modification in order to adapt it to different usages and conditions, and, accordingly, it is desired to comprehend such modifications within this invention as may fall within the scope of the appended claims.

I claim:

1. A hydraulic pump comprising; a housing having a cavity therein with flat parallel end walls, a member in the cavity fitting between said end walls having a bore therethrough normal to said end walls, said member sealingly engaging the peripheral wall of said cavity at four circumferentially spaced points to support the member for lateral shifting movement only in the cavity, said points of engagement between the member and the housing defining four separate chambers about said member and also providing guide means for guiding said member in said lateral shifting movement, a vaned rotor in the bore on the axis of said cavity, a spring in one of said chambers urging the member toward a position of maximum eccentricity of said bore relative to said rotor, ports in at least one of said end walls communicating with the space around said rotor for conveying fluid to and from said bore, pressure and suction conduit means connected with said ports, a restrictor in the pressure conduit means, passage means in the ring connecting the upstream side of said restrictor with the said chamber on the opposite side of said member from the chamber within which the spring is located and with the chamber on the side of said member toward which the member is thrust by the pressure developed by operation of the pump, a conduit leading from the downstream side of said restrictor to the chamber in which said spring is located and including a second restrictor therein, and a relief valve having its inlet connected with the downstream side of said second restrictor and its outlet connected with said suction conduit means.

2. A hydraulic pump comprising; a housing having a cavity therein with flat parallel end walls, a ring fitting between said end walls having rectilinear projections thereon about 90° apart sealingly engaging corresponding rectilinear recesses in the peripheral wall of said cavity thereby forming four separate chambers about said ring, said ring being laterally shiftable in one direction within said cavity and being guided in said shifting movement by said projections, a vaned rotor within the ring, spring means in one of said chambers biasing the ring toward a position of maximum eccentricity relative to said rotor, suction and pressure conduit means leading to the space about said rotor, a restrictor through which the discharge of the pump passes, means for impressing the pressure differential across said restrictor directly on said ring in opposition to the thrust of said spring means, and a relief valve connected between the downstream side of the restrictor and the pump inlet adapted to open at a predetermined pressure thereby suddenly to increase said pressure differential.

3. In a vane pump; a pump body having a cavity therein, a ring in said cavity, a vaned rotor in said ring, said ring being subjected to internal pressure over about one-half the inner periphery thereof on one side when the pump operates, said ring having projections thereabout at intervals of about 90° extending sealingly into recesses formed in the periphery of said cavity thereby forming four separate chambers about said ring with one of the chambers being on the said one side of the ring, the chamber on the said one side of said ring having a projected area substantially equal to the projected area of the inside of the ring that is subjected to pressure when the pump operates minus the area of one of said projections, and means connecting the pressure side of the pump with the said chamber on the said one side of the said ring whereby the thrusts on the ring due to the pressures developed in the pump during operation are substantially balanced.

References Cited in the file of this patent

UNITED STATES PATENTS

| | | |
|---|---|---|
| 2,124,140 | Foster et al. | July 19, 1938 |
| 2,423,271 | Talbot | July 1, 1947 |
| 2,451,666 | DeLancey | Oct. 19, 1948 |
| 2,538,194 | Ferris | Jan. 16, 1951 |
| 2,588,644 | McLeod | Mar. 11, 1952 |
| 2,600,632 | French | June 17, 1952 |
| 2,612,114 | Ernst | Sept. 30, 1952 |
| 2,653,552 | Geeraert | Sept. 29, 1953 |
| 2,678,607 | Hufferd et al. | May 18, 1954 |
| 2,768,582 | Klessig et al. | Oct. 30, 1956 |
| 2,775,946 | Hufferd | Jan. 1, 1957 |
| 2,799,995 | Herman | July 23, 1957 |
| 2,894,458 | Hallman | July 14, 1959 |